(12) United States Patent
Hwang

(10) Patent No.: US 9,052,103 B2
(45) Date of Patent: Jun. 9, 2015

(54) FLASHLIGHT HOLDER ASSEMBLY

(71) Applicant: Chin Yu Hwang, Changhua (TW)

(72) Inventor: Chin Yu Hwang, Changhua (TW)

( * ) Notice: Subject to any disclaimer, the term of this patent is extended or adjusted under 35 U.S.C. 154(b) by 63 days.

(21) Appl. No.: 13/956,637

(22) Filed: Aug. 1, 2013

(65) Prior Publication Data

US 2015/0034506 A1    Feb. 5, 2015

(51) Int. Cl.
*B65D 85/20* (2006.01)
*F21V 21/06* (2006.01)
*F16M 11/08* (2006.01)
*F16M 13/02* (2006.01)

(52) U.S. Cl.
CPC ............. *F21V 21/06* (2013.01); *F16M 11/08* (2013.01); *F16M 13/022* (2013.01)

(58) Field of Classification Search
CPC ............ A45C 1/26; A45C 11/26; F21L 4/00; F21L 4/02; F21L 4/04; F21V 21/00; F21V 21/14; B65D 85/20
USPC .......... 206/349, 446, 573; 211/26, 60.1, 70.6, 211/89, 89.01; 248/121, 185, 185.1; 362/84, 85, 190–209
See application file for complete search history.

(56) References Cited

U.S. PATENT DOCUMENTS

| | | | |
|---|---|---|---|
| 4,307,862 A * | 12/1981 | Claussen | 248/121 |
| 4,855,881 A | 8/1989 | Pence | |
| 4,907,769 A | 3/1990 | Hunley, Jr. et al. | |
| 5,071,004 A | 12/1991 | Rivera | |
| 5,276,596 A | 1/1994 | Krenzel | |
| 5,413,223 A | 5/1995 | Kang | |
| 5,685,421 A | 11/1997 | Gilmore | |
| 5,879,072 A | 3/1999 | Huang | |
| 6,749,166 B2 | 6/2004 | Valentine et al. | |
| 7,033,042 B2 * | 4/2006 | Lim | 362/202 |
| 7,513,633 B2 * | 4/2009 | Ermeti | 362/84 |

* cited by examiner

*Primary Examiner* — Bryon Gehman
(74) *Attorney, Agent, or Firm* — Charles E. Baxley

(57) ABSTRACT

A flashlight holder assembly includes a supporting base device having a follower which includes a recess, and a flashlight has one end portion for engaging with the recess of the follower and for being supported in an erected position with the follower, the supporting base device includes a carrier, and the follower is pivotally attached onto the carrier and rotatable relative to the carrier between a folded position and an opened working position. The carrier and the follower each include one or more outwardly extended legs which are contactable with each other for limiting the follower to rotate relative to the carrier and for allowing the legs of the carrier and the follower to be rotated relative to each other.

11 Claims, 7 Drawing Sheets

FLASHLIGHT HOLDER ASSEMBLY

BACKGROUND OF THE INVENTION

1. Field of the Invention

The present invention relates to a flashlight holder assembly, and more particularly to an emergency flashlight holder assembly including a simplified foldable holder base which may be easily and quickly folded and opened for quickly supporting an emergency flashlight and for allowing the flashlight to be quickly and readily used for emergency purposes without being grasped or held by the user.

2. Description of the Prior Art

Various kinds of typical flashlight holder assemblies have been developed and provided for supporting a flashlight or the like and for allowing the flashlight to be worked or used without being grasped or held by the user, and the typical flashlight holder assemblies normally comprise a supporting stand or base including a rack or carrying or supporting member for attaching or mounting or securing or anchoring or retaining or supporting the flashlight or the like.

For example, U.S. Pat. No. 4,855,881 to Pence, U.S. Pat. No. 4,907,769 to Hunley, Jr. et al., U.S. Pat. No. 5,071,004 to Rivera, U.S. Pat. No. 5,276,596 to Krenzel, U.S. Pat. No. 5,413,223 to Kang, U.S. Pat. No. 5,685,421 to Gilmore, U.S. Pat. No. 5,879,072 to Huang, and U.S. Pat. No. 6,749,166 to Valentine et al. disclose several of the typical flashlight holder assemblies each comprising a housing or receptacle or casing or container or supporting stand or base including a complicated rack or carrying or supporting member for attaching or mounting or securing or anchoring or retaining or supporting the flashlight or the like.

However, the rack or carrying or supporting members of the supporting stands or bases may not be easily and quickly folded and opened such that the flashlight may not be easily and quickly held or supported on the supporting stands or bases for emergency purposes.

The present invention has arisen to mitigate and/or obviate the afore-described disadvantages of the conventional flashlight holder assemblies.

SUMMARY OF THE INVENTION

The primary objective of the present invention is to provide a flashlight holder assembly including a simplified foldable holder base which may be easily and quickly folded and opened for quickly supporting an emergency flashlight and for allowing the flashlight to be quickly and readily used for emergency purposes without being grasped or held by the user.

The other objective of the present invention is to provide a flashlight holder assembly including a simplified structure or configuration that may be made or manufactured with a simplified making or manufacturing procedure and with a greatly decreased manufacturing cost.

In accordance with one aspect of the invention, there is provided a flashlight holder assembly comprising a supporting base device including a follower having a recess formed therein, and a flashlight having a first end portion for selectively engaging with the recess of the follower and for being supported in an erected position with the follower of the supporting base device and for allowing the flashlight to be quickly and readily used for emergency purposes without being grasped or held by the user.

The supporting base device includes a carrier, and the follower is pivotally attached onto the carrier and selectively rotatable relative to the carrier between a folded position and an opened working position.

The carrier includes a first leg extended outwardly therefrom, and the follower includes a second leg extended outwardly therefrom and rotatable relative to the first leg of the carrier, and the first leg of the carrier and the second leg of the follower are contactable or engageable with each other for limiting the follower to rotate relative to the carrier and for allowing the first leg of the carrier and the second leg of the follower to be rotated relative to each other between the folded position and the opened working position.

The carrier includes at least one third leg extended outwardly therefrom and preferably extended opposite to the first leg, and the follower includes at least one fourth leg extended outwardly therefrom and preferably extended opposite to the second leg. The carrier includes a hub, and the follower includes a protrusion extended therefrom and engaged with the hub of the carrier for rotatably attaching or mounting or coupling the follower to the carrier.

The carrier includes a depression formed therein, and the protrusion of the follower is engaged into the depression of the carrier, and the hub of the carrier is also extended into the depression of the carrier and engaged with the protrusion of the follower.

The supporting base device includes a plate engaged into the recess of the follower, and a fastener engaged through the plate and engaged with the hub of the carrier for rotatably securing the follower to the carrier and for allowing the follower to be rotated relative to the carrier between the folded position and the opened working position.

The follower includes at least one projection extended into the recess of the follower for frictionally engaging with the first end portion of the flashlight and for stably attaching or mounting or anchoring or retaining or supporting the flashlight in the erected position.

A receptacle may further be provided and includes a chamber formed therein for receiving and engaging with the supporting base device, and includes a compartment formed therein for receiving and engaging with the flashlight.

The receptacle includes a housing member and a cover pivotally coupled together with a hinge device for allowing the housing member and the cover to be rotated relative to each other between a folded position and an opened position.

The chamber is formed in the housing member and the cover and formed and defined by partitions for receiving and engaging with the supporting base device. The receptacle includes two end spaces formed therein, and two rubber pads or spongy or cushioning members engaged in the spaces of the receptacle and engaged with the ends of the flashlight for cushioning and supporting and protecting the flashlight.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
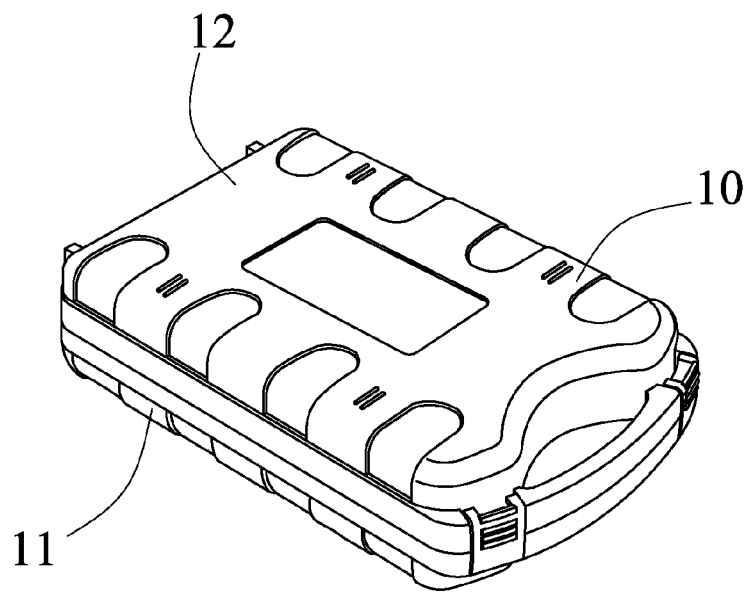
FIG. 1 is a perspective view of a flashlight holder assembly in accordance with the present invention, in a folded or closed status or position.
Figure 2:
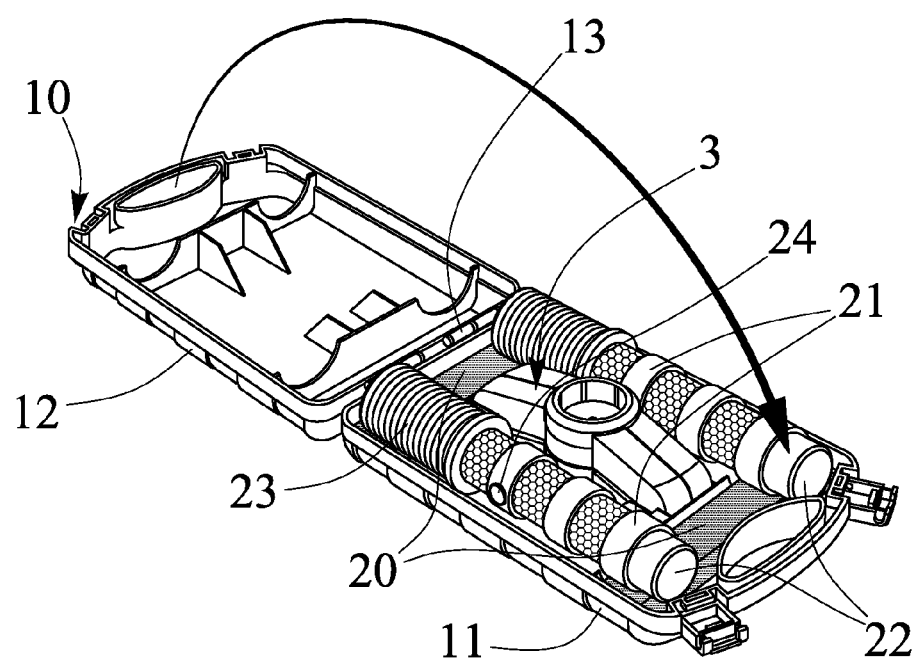
FIG. 2 is a perspective view of the flashlight holder assembly, in an opened status or position.
Figure 3:
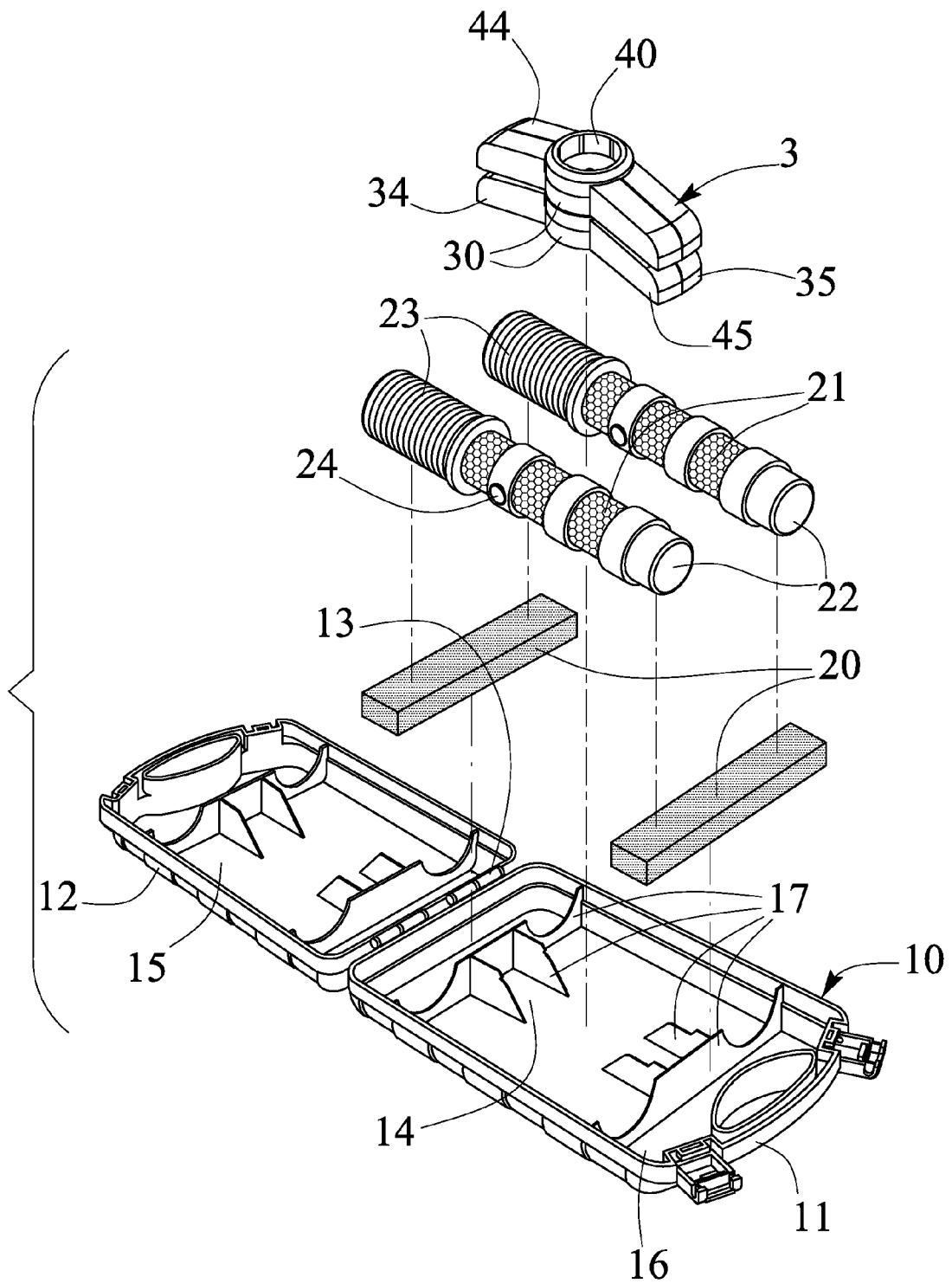
FIG. 3 is a partial exploded view of the flashlight holder assembly.

Referring to the drawings, and initially to FIGS. 1-3, a flashlight holder assembly in accordance with the present invention comprises a housing or container or outer receptacle 10 including two housing members or a lower housing member 11 and an upper cover 12 pivotally or rotatably attached or mounted or secured or hinged or coupled together with a pivot axle or hinge device 13 for allowing the lower housing member 11 and the upper cover 12 to be pivoted or rotated relative to each other between a folded or closed status or position (FIG. 1) and an opened status or position (FIGS. 2 and 3). The housing member 11 and/or the cover 12 each include a chamber 14, one or more (such as two) compartments 15, and one or more (such as two) spaces 16 formed therein and formed or defined by ribs or fences or panels or walls or partitions 17.

For example, the chamber 14 of the housing member 11 and/or the cover 12 is formed and located between the two side compartments 15, and the chamber 14 and the side compartments 15 are formed and located between the two end spaces 16 of the housing member 11 and/or the cover 12. The spaces 16 of the housing member 11 and/or the cover 12 may be provided for receiving or engaging with or containing or storing the spongy or rubber pads or cushioning members 20, and the side compartments 15 of the housing member 11 and/or the cover 12 may be provided for receiving or engaging with or containing or storing the emergency flashlights 21 or the like, and the chamber 14 of the housing member 11 and/or the cover 12 may be provided for receiving or engaging with or containing or storing the supporting stand or base device 3.

Figure 4:
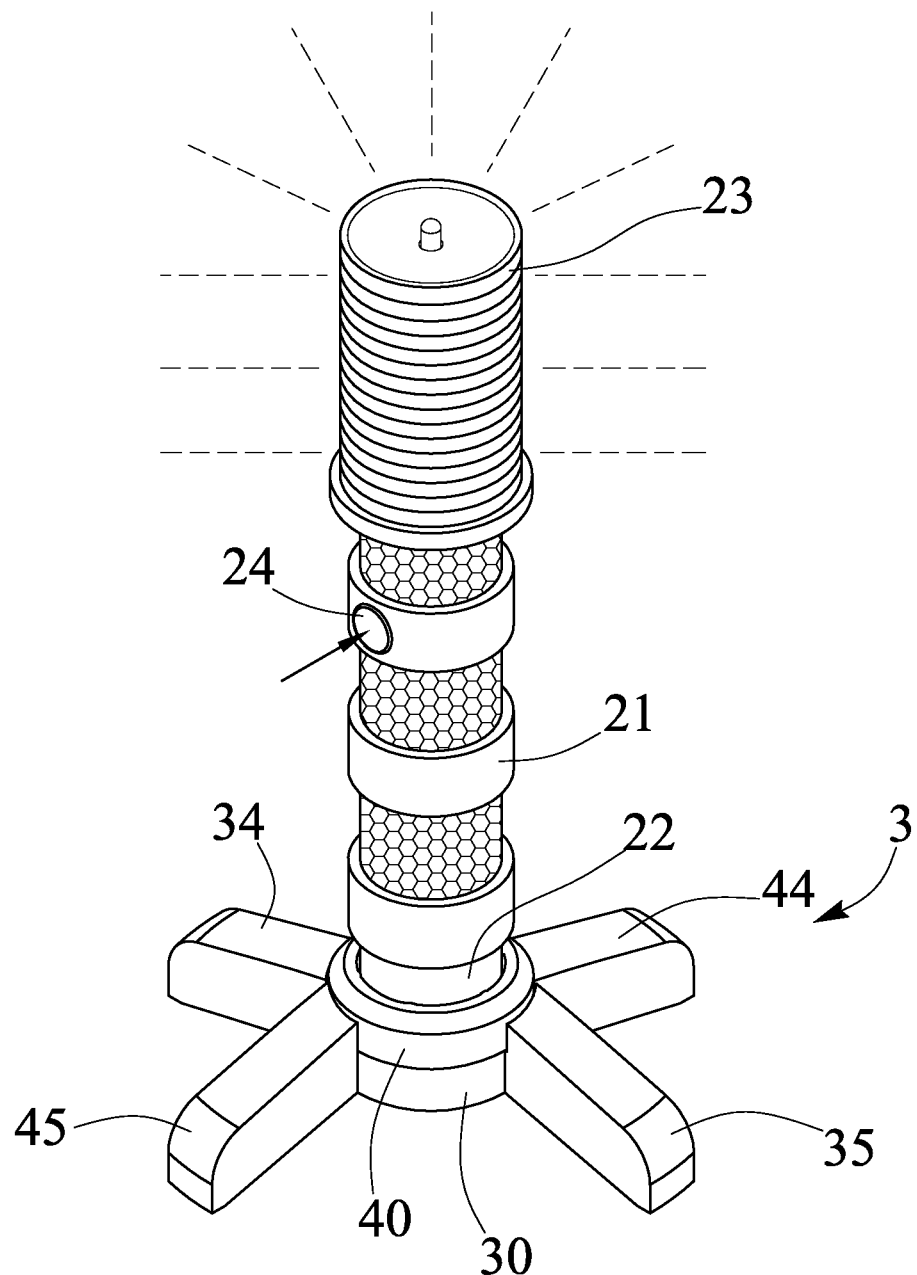
FIG. 4 is a perspective view illustrating a flashlight and a foldable and openable supporting stand or base of the flashlight holder assembly.
Figure 5:
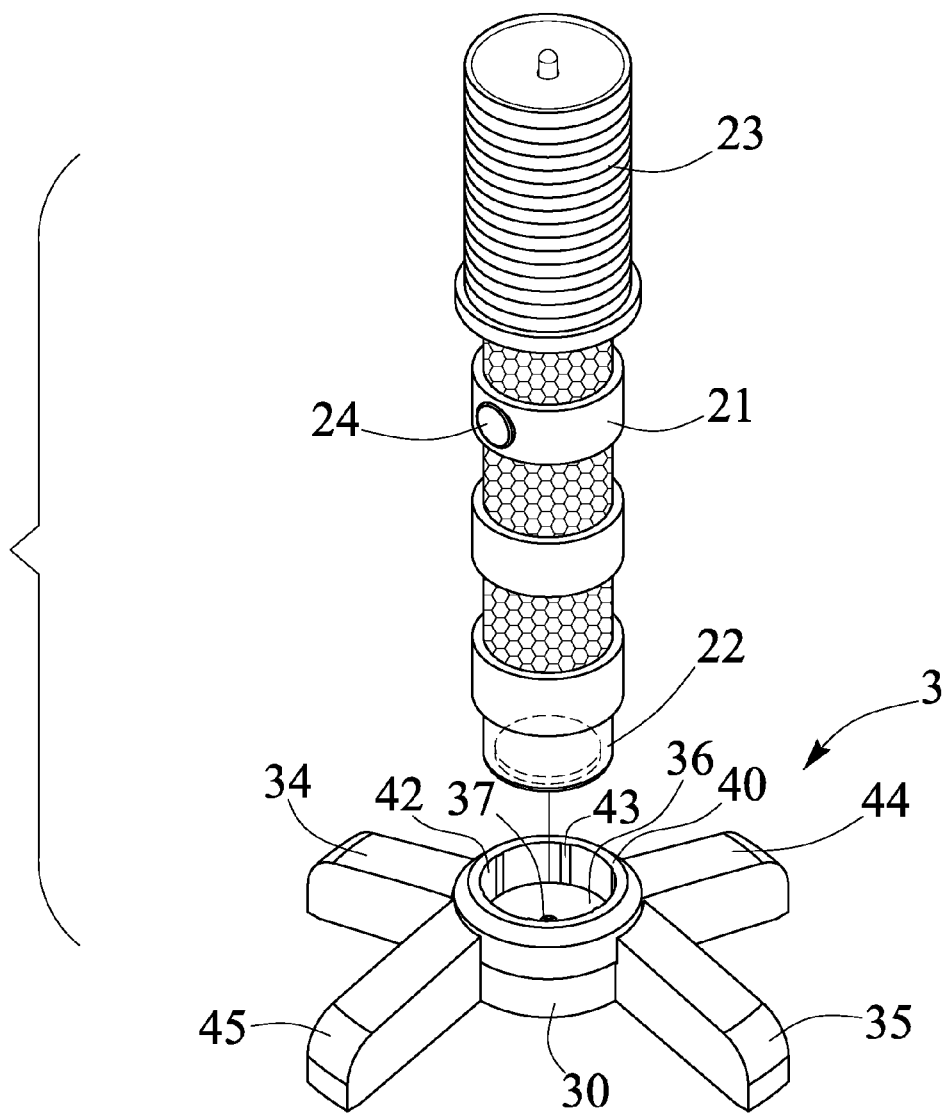
FIG. 5 is a partial exploded view of the flashlight and the foldable and openable supporting stand or base of the flashlight holder assembly.
Figure 6:
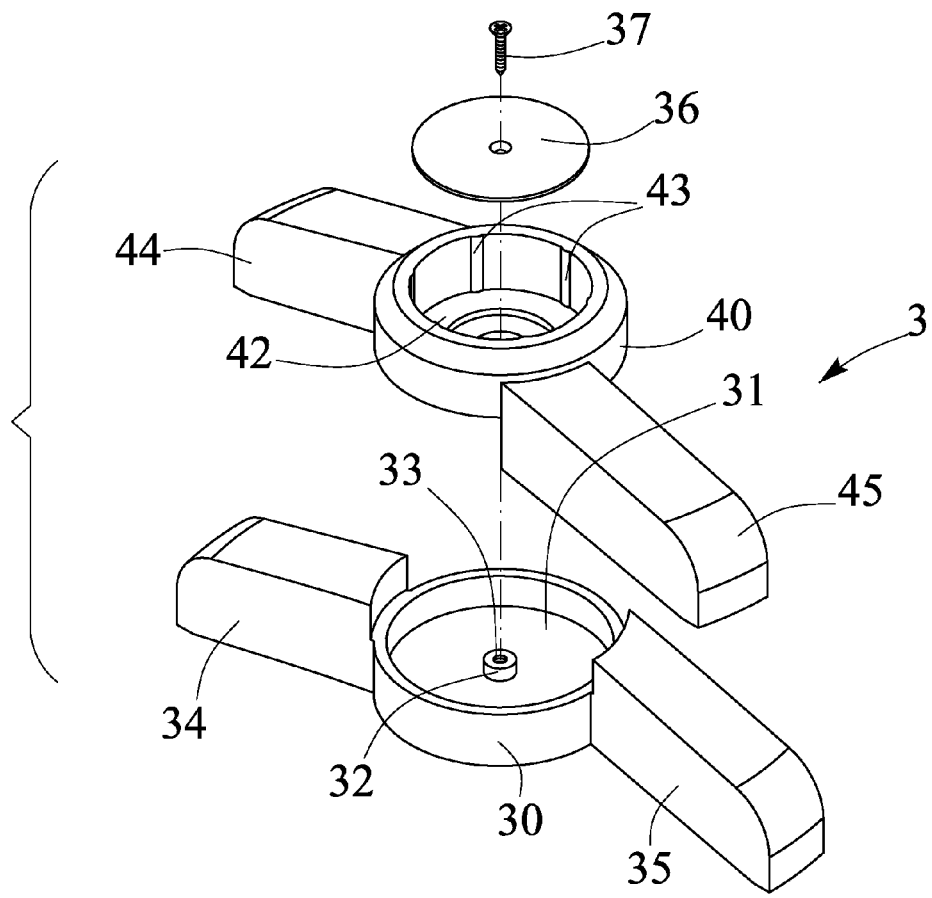
FIG. 6 is an exploded view of the foldable and openable supporting stand or base of the flashlight holder assembly.
Figure 7:
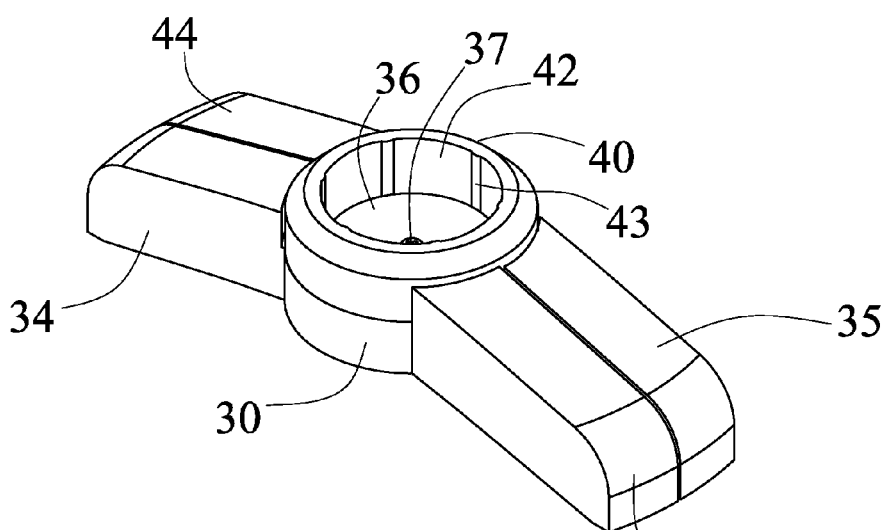
FIG. 7 is a perspective view of the foldable and openable supporting stand or base of the flashlight holder assembly, in a folded or closed status or position.
Figure 8:
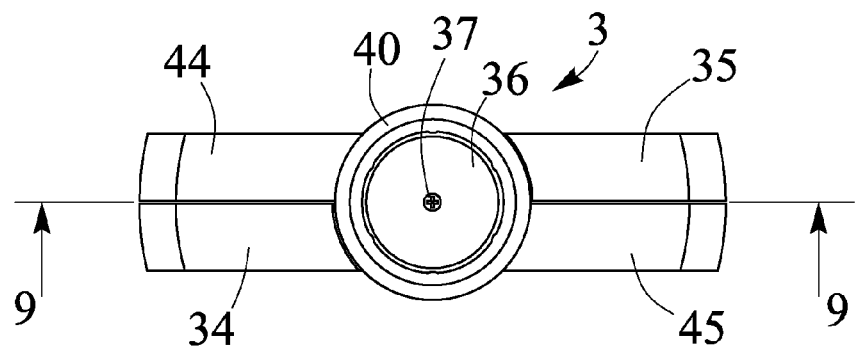
FIG. 8 is a top plan schematic view of the supporting stand or base of the flashlight holder assembly as shown in FIG. 7.
Figure 9:
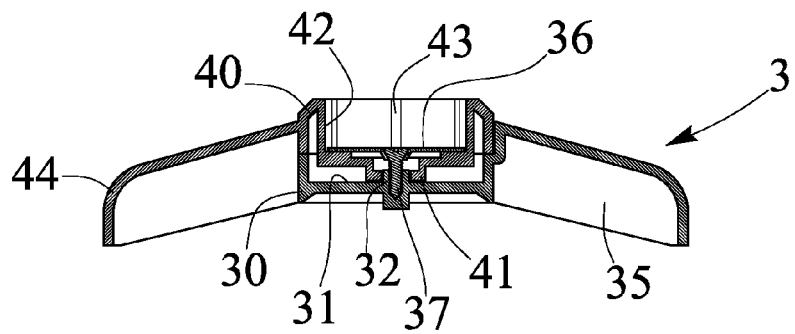
FIG. 9 is a cross sectional view of the supporting stand or base of the flashlight holder assembly, taken along lines 9-9 of FIG. 8.

As shown in FIGS. 4-5, the flashlight 21 includes a lower or bottom or one end portion or first end portion 22 for selectively engaging with the supporting base device 3 and for being supported in an erected status or position by or with the supporting base device 3 (FIG. 4), and includes an upper or other or second end portion 23 for sidewise and/or outwardly illumination or lighting purposes, and includes a knob or button 24 for actuating or operating the flashlight 21. The flashlight 21 may be selected from various kinds of flashlights which may generate and emit lights out for illumination or lighting purposes, and preferably includes an upper or other or second end portion 23 for allowing the light to emit outwardly and forwardly and/or sidewise (FIG. 4) for emergency illumination or lighting purposes. The cushioning members 20 may be used or provided for contacting or engaging with and cushioning or supporting or protecting the end portions 22, 23 of the flashlight 21.

As shown in FIGS. 6-9, the supporting base device 3 includes a lower or bottom carrier 30 having a circular cross section and having a chamber or compartment or space or depression 31 formed therein, and having a protrusion or projection or hub 32 extended upwardly into the depression 31 of the carrier 30, and having an engaging screw hole 33 formed in the hub 32, and having one or more (such as two) fingers or limbs or protrusions or extensions or legs 34, 35 oppositely extended outwardly therefrom; and includes an upper rotary member or follower 40 pivotally or rotatably attached or mounted or secured or carried or supported on the carrier 30, and the follower 40 includes a projection or hub or protrusion 41 (FIG. 9) extended downwardly therefrom and engaged into the depression 31 of the carrier 30, and engaged with the hub 32 of the carrier 30 for pivotally or rotatably attaching or mounting or securing or coupling the follower 40 to the carrier 30.

For example, a retaining or positioning or anchoring panel or plate 36 is engaged onto the follower 40, and a catch or lock or latch or fastener 37 is engaged through the plate 36 and the protrusion 41, and engaged with the engaging screw hole 33 of the hub 32 of the carrier 30 for pivotally or rotatably attaching or mounting or securing or coupling the follower 40 to the carrier 30, and for preventing the follower 40 from being disengaged or separated from the carrier 30. The follower 40 includes a chamber or compartment or space or depression or recess 42 formed therein for receiving or engaging with the plate 36 and the fastener 37, and also for receiving or engaging with the lower or bottom or one end portion or first end portion 22 of the flashlight 21 (FIG. 4), and includes one or more protrusions or keys or ribs or projections 43 extended radially into the recess 42 of the follower 40 for frictionally engaging with the lower or bottom or one end portion or first end portion 22 of the flashlight 21 and for solidly and stably supporting the flashlight 21 in the erected status or position.

Figure 10:
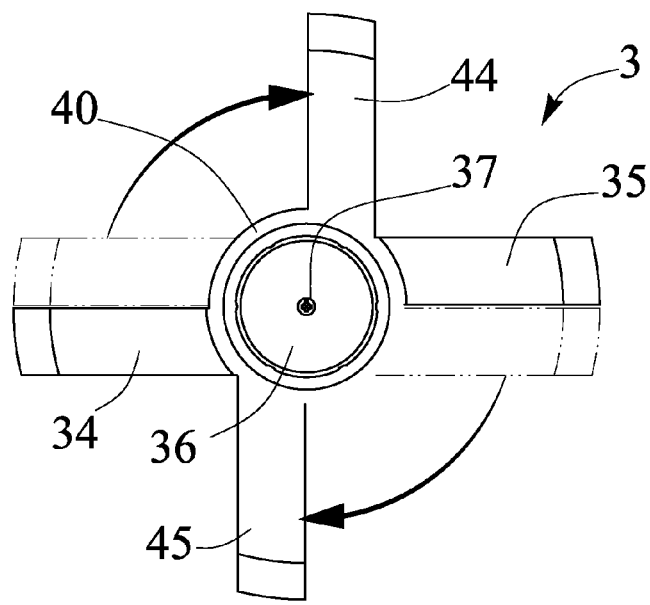
FIG. 10 is a top plan schematic view similar to FIG. 8, illustrating the operation of the supporting stand or base of the flashlight holder assembly.

The follower 40 includes one or more (such as two) fingers or limbs or protrusions or extensions or legs 44, 45 oppositely extended outwardly therefrom and pivotal or rotatable relative to the legs 34, 35 of the carrier 30, and the legs 44, 45 of the follower 40 are contactable or engageable with the legs 34, 35 of the carrier 30 for limiting the follower 40 to pivot or rotate relative to the carrier 30, and for allowing the legs 44, 45 of the follower 40 to be pivoted or rotated relative to the legs 34, 35 of the carrier 30 between the folded or closed or stored status or position (FIGS. 2-3, 7-8) and the opened working status or position (FIGS. 4-5, and solid lines in FIG. 10).

In operation, as shown in FIGS. 2-5 and 7-10, the supporting base device 3 may be easily and quickly removed or disengaged from the receptacle 10, and the legs 34, 35, 44, 45 of the carrier 30 and the follower 40 may be easily and quickly pivoted or rotated relative to each other from the folded or closed or stored status or position (FIGS. 2-3, 7-8) to the opened working status or position (FIGS. 4-5, and solid lines in FIG. 10), and the lower or bottom or one end portion or first end portion 22 of the flashlight 21 may be easily and quickly engaged into the recess 42 of the follower 40 for allowing the flashlight 21 to be solidly and stably supported on the supporting base device 3 at the erected status or position, and for allowing the light to emit outwardly and forwardly and/or sidewise (FIG. 4) from the flashlight 21 and for emergency illumination or lighting purposes.

Figure 11:
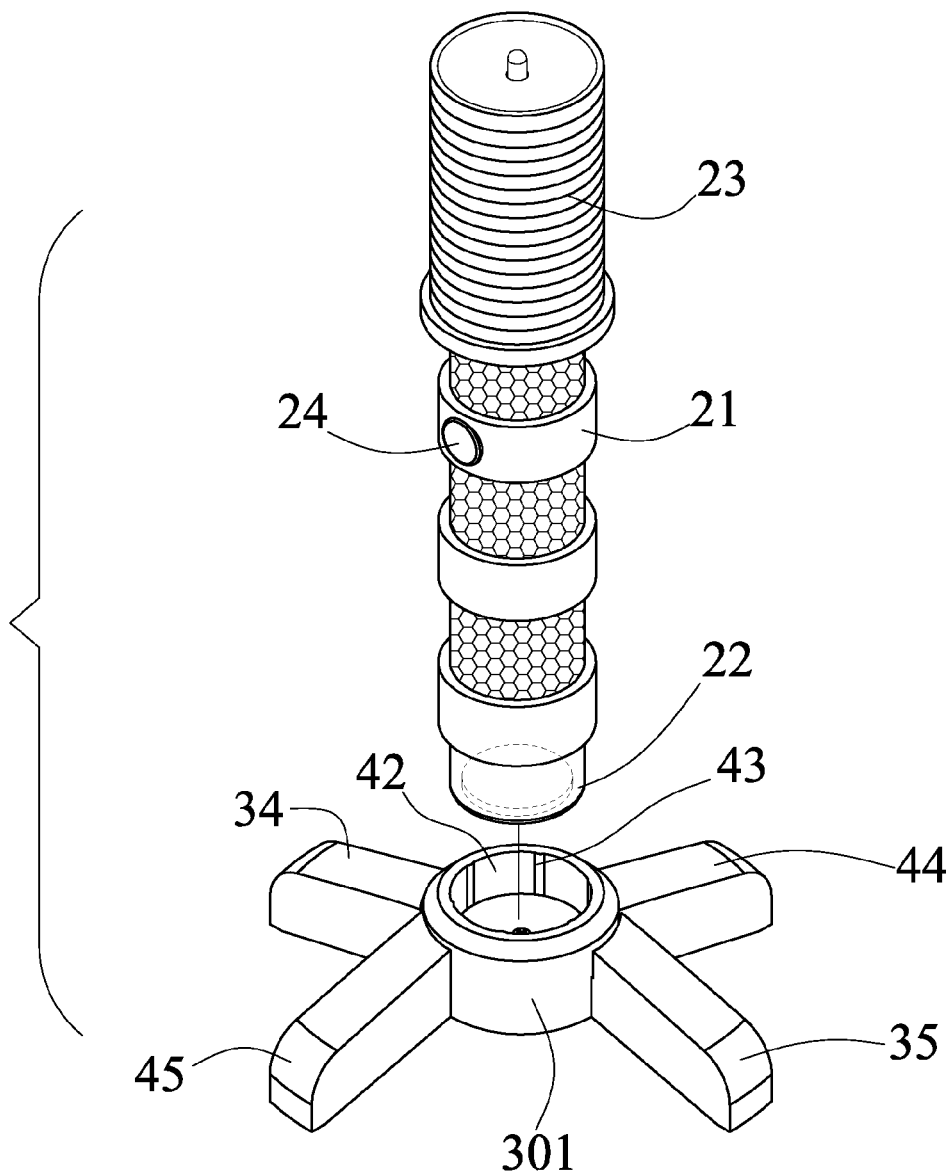
FIG. 11 is a partial exploded view similar to FIG. 5, illustrating the other arrangement of the flashlight holder assembly.

For example, when in an emergency situation, the flashlight 21 may be easily and quickly supported on the supporting base device 3 at the erected status or position, and the supporting base device 3 may be disposed at any selected or suitable position for generating and emitting lights out for illumination or lighting purposes, and the user is not required to hold or grasp or support the flashlight 21, such that the user may safely treat or handle the emergency situation without worrying about the flashlight 21, and without being hit by the other vehicles or the like. Alternatively, as shown in FIG. 11, the carrier and the follower combination 301 may be formed integral as one piece, and the legs 34, 35, 44, 45 of the carrier and the follower combination 301 may be directly extended outwardly from the carrier and the follower combination 301 in a non-foldable structure.

Accordingly, the flashlight holder assembly in accordance with the present invention includes a simplified foldable holder base which may be easily and quickly folded and opened for quickly supporting an emergency flashlight and for allowing the flashlight to be quickly and readily used for emergency purposes without being grasped or held by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A flashlight holder assembly comprising:
a supporting base device including a follower having a recess formed therein, and said supporting base device including a carrier, and said follower being pivotally attached onto said carrier and rotatable relative to said carrier between a folded position and an opened working position, and
a flashlight having a first end portion for selectively engaging with said recess of said follower and for being supported in an erected position with said follower of said supporting base device.

2. The flashlight holder assembly as claimed in claim 1, wherein said carrier includes a first leg extended outwardly therefrom, and said follower includes a second leg extended outwardly therefrom and rotatable relative to said first leg of said carrier, and said first leg of said carrier and said second leg of said follower are contactable with each other for limiting said follower to rotate relative to said carrier and for allowing said first leg of said carrier and said second leg of said follower to be rotated relative to each other between the folded position and the opened working position.

3. The flashlight holder assembly as claimed in claim 2, wherein said carrier includes at least one third leg extended outwardly therefrom, and said follower includes at least one fourth leg extended outwardly therefrom.

4. The flashlight holder assembly as claimed in claim 1, wherein said carrier includes a hub, and said follower includes a protrusion extended therefrom and engaged with said hub of said carrier for rotatably attaching said follower to said carrier.

5. The flashlight holder assembly as claimed in claim 4, wherein said carrier includes a depression formed therein, and said protrusion of said follower is engaged into said depression of said carrier, and said hub of said carrier is extended into said depression of said carrier.

6. The flashlight holder assembly as claimed in claim 1, wherein said supporting base device includes a plate engaged into said recess of said follower, and a fastener engaged through said plate and engaged with said hub of said carrier for rotatably securing said follower to said carrier.

7. The flashlight holder assembly as claimed in claim 1, wherein said follower includes at least one projection extended into said recess of said follower for frictionally engaging with said first end portion of said flashlight and for stably supporting said flashlight in the erected position.

8. The flashlight holder assembly as claimed in claim 1 further comprising a receptacle including a chamber formed therein for receiving and engaging with said supporting base device, and including a compartment formed therein for receiving and engaging with said flashlight.

9. The flashlight holder assembly as claimed in claim 8, wherein said receptacle includes a housing member and a cover pivotally coupled together with a hinge device for allowing said housing member and said cover to be rotated relative to each other between a folded position and an opened position.

10. The flashlight holder assembly as claimed in claim 9, wherein said chamber is formed in said housing member and said cover and formed and defined by partitions.

11. A flashlight holder assembly comprising:
a supporting base device including a follower having a recess formed therein,
a flashlight having a first end portion for selectively engaging with said recess of said follower and for being supported in an erected position with said follower of said supporting base device, and
a receptacle including a chamber formed therein for receiving and engaging with said supporting base device, and including a compartment formed therein for receiving and engaging with said flashlight, said receptacle including two end spaces formed therein, and two cushioning members engaged in said spaces of said receptacle and engaged with said flashlight for cushioning said flashlight.

* * * * *